United States Patent [19]

Bentley

[11] 4,190,286
[45] Feb. 26, 1980

[54] INFLATABLE SEAT CUSHION AND BODY SUPPORT ASSEMBLY

[76] Inventor: John P. Bentley, 100 Dixie Plaza, 1250 S. Service Rd., Mississauga, Ontario, Canada

[21] Appl. No.: 862,542

[22] Filed: Dec. 20, 1977

[51] Int. Cl.² ............................................. A47C 7/42
[52] U.S. Cl. ........................... 297/284; 297/DIG. 3; 297/230
[58] Field of Search ................ 297/284, DIG. 3, 250, 297/254, 230, 231

[56] References Cited

U.S. PATENT DOCUMENTS

| | | | |
|---|---|---|---|
| 2,589,013 | 3/1952 | Martin | 297/183 X |
| 3,330,598 | 7/1967 | Whiteside | 297/DIG. 3 |
| 3,348,880 | 10/1967 | Swann | 297/284 X |
| 3,363,941 | 1/1968 | Wierwille | 297/284 |
| 4,067,078 | 1/1978 | Winston | 297/284 |
| 4,078,842 | 3/1978 | Zur | 297/DIG. 3 |

FOREIGN PATENT DOCUMENTS 2155058  5/1973  Fed. Rep. of Germany .... 297/DIG. 3

Primary Examiner—Francis K. Zugel
Attorney, Agent, or Firm—Donald E. Hewson

[57] ABSTRACT

A seat cushion and body support assembly is provided where the cushion comprises a plurality of individually inflatable chambers. Each of the chambers is connected, through its own conduit means, to a controllable pressure source so that, when desired, the chambers can be inflated. The chambers may all be inflated simultaneously, and thereafter the operator can control individual vent or dump valves to reduce the pressure or volume of pressure fluid in any respective chamber, thereby achieving a desired contour for the cushion for purposes of body or back support; or the chambers may be individually inflated by operation of a respective valve for each chamber. The inflatable seat cushion and body support is portable, and is particularly intended for use in vehicles such as automobiles and trucks.

7 Claims, 4 Drawing Figures

INFLATABLE SEAT CUSHION AND BODY SUPPORT ASSEMBLY

FIELD OF THE INVENTION

This invention relates to an inflatable seat cushion and body support assembly, particularly ones which are portable and may be placed on an existing seat in places such as vehicles. In particular, this invention relates to an inflatable seat cushion and body support which is adapted for use in automobiles, trucks, and the like, and provides a seat cushion whose contour can be controlled so as to suit the individual requirements, from time to time of the operator of the vehicle.

BACKGROUND OF THE INVENTION

For nearly as long as vehicles such as automobiles and trucks have been driven, particularly over long distances on highways, the operators of such vehicles have suffered to a greater or lesser extent from aching backs. Such problems have generally occured because the anatomy of each operator of such vehicles is different, but the manufacturers of the vehicles have provided very little adjustment or control of the seat in which the operator sits, except as to height, inclination, tilt and distance from the controls of the vehicle. There has been generally very little attempt made to provide seats which adapt to the anatomy of the operator, and provide adequate spinal or lumbar support.

Indeed, operators of such vehicles as police cars and taxi cabs, trucks—particularly long distance haulers—and the like, are particularly inclined to suffer from sore backs because of the inadequate or improper support. However, because such vehicles may have a number of different operators, rather than the same person at all times, it is impractical to build and install in such vehicle a support which is particularly adapted to the anatomy of any particular operator. Further, the operators of such vehicles themselves may, from time to time operate different vehicles, and therefore require a support for their own person which would be readily and easily portable from vehicle to vehicle. (For purposes of the present discussion, operators of automotive vehicles are particularly considered; the present invention should not be construed to be applicable only to the classes of vehicle operators referred to above, but may extend to all persons requiring back or body support, where the requirements may change from time to time or where the support means itself should be portable from place to place.)

Accordingly, the present invention provides an inflatable seat cushion and body support which is such that it may be readily portable from place to place, and is such that its overall contour may be adapted to any particular desired contour, within limits, by control of the amount of inflation of a number of individually inflatable chambers which comprise the present inflatable seat cushion.

Thus, the present invention provides a seat cushion and body support which is inflatable and comprises a plurality of independent and individually inflatable chambers, where each of the plurality of chambers is secured to at least one other of the chambers for purposes of structural integrity and portablity. Means are provided for controlling the amount of inflation in each of the chambers, so that each chamber has a first valve means which connects the chamber to a pressure source of fluid for inflating the chamber, and conduit means for the fluid between the first valve means and the chamber, where the first valve means are closable for maintaining the fluid in the chamber at a desired amount of inflation thereof; and further, there are provided second valve means for each chamber which are in fluid communication with the conduit means—and therefore with the chamber—and which are operable to release fluid from the chamber in any amounts as may be desired.

In general, it is anticipated that the fluid which is used for inflating the individual chambers of the inflatable seat cushion would be air, and that the pressure source for the air would be a pump which may either be a manually operated or from within the vehicle itself. Other sources of pressure could be pressurized air from tanks therefor, or indeed the inflating fluid for the inflatable chambers could be a liquid such as water or hydraulic oil. In fact, with proper precautions, the inflating fluid could be exhaust gases or the like.

It follows from the above that, in order for the inflatable seat cushion to be easily controlled and operated, that it is particularly desirable to provide means whereby the amount of inflation of each of the individual chambers may be easily controlled; and yet, to provide such means economically and without excessive mass or weight. Accordingly, the present invention provides that all of the individual chambers of the seat cushion may be pressurized simultaneously, and thereafter, the desired contour of the seat cushion would be achieved by venting or dumping the pressurized fluid therefrom by operating a simple valve which is provided for that purpose. Alternatively, each of the chambers may be individually pressurized by operation and control of suitable valve means therefor. A particular feature of the present invention is, therefore, the provision of suitable valve means to accomplish the purposes of the invention easily and economically, and with ruggedness of construction as may be required.

BRIEF SUMMARY OF THE INVENTION

It is therefore a principal object of this invention to provide an inflatable seat cushion and body or back support assembly which may be easily portable, economical, and easy to operate, and which is particularly adapted for use in automotive vehicles and the like.

A further object of this invention is to provide an inflatable seat cushion and body support assembly where the individual chambers of the seat cushion are separately controllable as to the amount of inflation thereof.

Yet another object of this invention is to provide an inflatable seat cushion and body support assembly which may be easily mass produced and provided to the market at a very reasonable cost.

BRIEF DESCRIPTION OF THE DRAWINGS

These and other features and objects of the invention are more clearly discussed hereafter, in association with the accompanying drawings, in which.

DESCRIPTION OF THE PREFERRED EMBODIMENTS

As noted above, the present invention provides an inflatable seat cushion and body support assembly, including the inflatable seat cushion portion, the control means, and conduit means interconnecting the control and seat cushion portions of the assembly. While it is contemplated that a particular use to which the inflatable seat cushion and body support assembly of the present invention will be put is as a back support for operators of vehicles, and the drawings are thereby more particularly related to such use, it has also been noted that the inflatable seat cushion and body support of this invention may have broader uses and purposes, including even for use by persons engaged in sedentary activities in offices, and the like.

Figure 1:
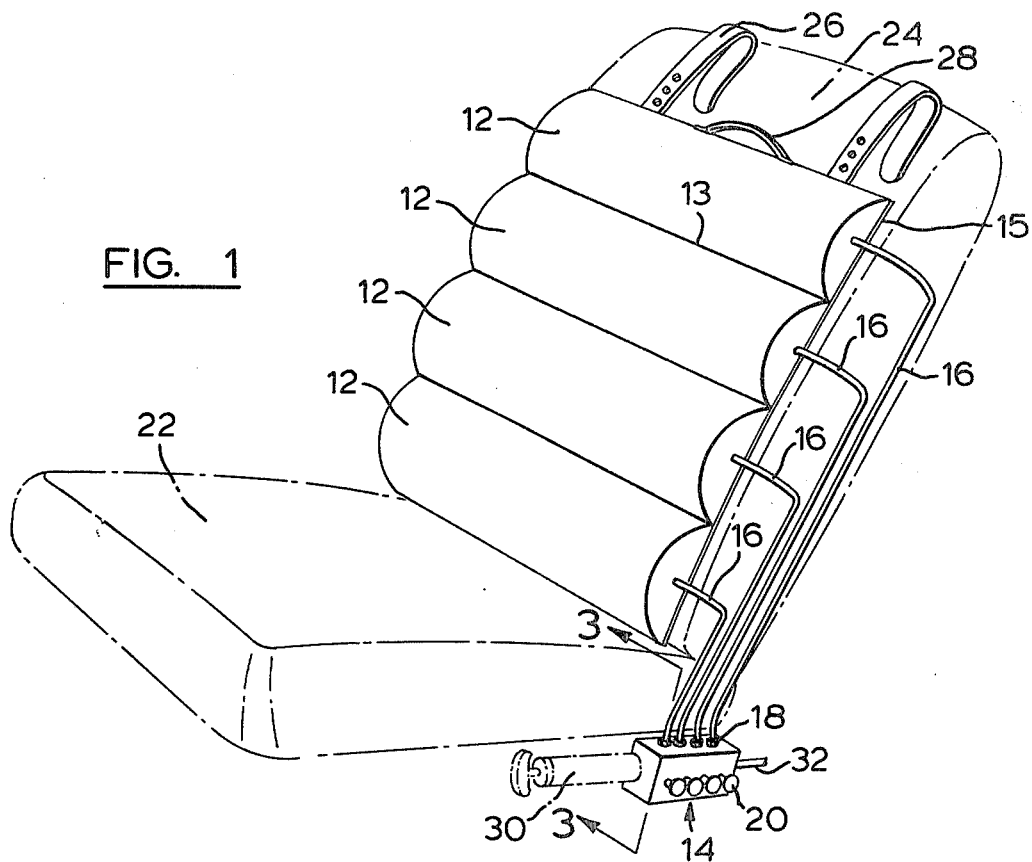
FIG. 1 is a perspective view of a typical inflatable seat cushion and body support assembly according to this invention showing its relationship to such as the operator seat of a vehicle.

FIG. 1 shows an assembly 10 which comprises a plurality of independent and individually inflatable chambers 12. The number of chambers 12 which may be provided may vary, but a typical embodiment of the inflatable seat cushion of the present invention includes four such chambers, as shown. Each of the chambers 12 is secured to at least one of the other chambers—or to two chambers in the case of those other than the ones at the ends of the assembly—for purposes of structural integrity of the seat cushion assembly per se. The size of each of the chambers 12 may be equal to each of the other chambers, or the sizes of the individual chambers 12 may vary to some extent, depending on the overall general contour of the seat cushions which is anticipated. The material from which the seat cushion assembly which comprises the plurality of chambers 12 may be manufactured may be any suitable material capable of withstanding relatively low pressures of the inflating fluid to be used, but also capable of withstanding fairly high shocks. Heat sealable vinyl is particularly adaptable to such purposes, but other plastics and fibre reinforced materials may be used.

It is necessary to control the amount of inflation in each of the chambers 12, and a control block 14 is provided for those purposes. A number of conduits 16 are secured to the control block 14 by means such as nuts 18, and a plurality of control buttons 20 are provided on the side of the control block 14. There are as many control buttons 20 as there are chambers 12 and conduits 16.

Figure 2:
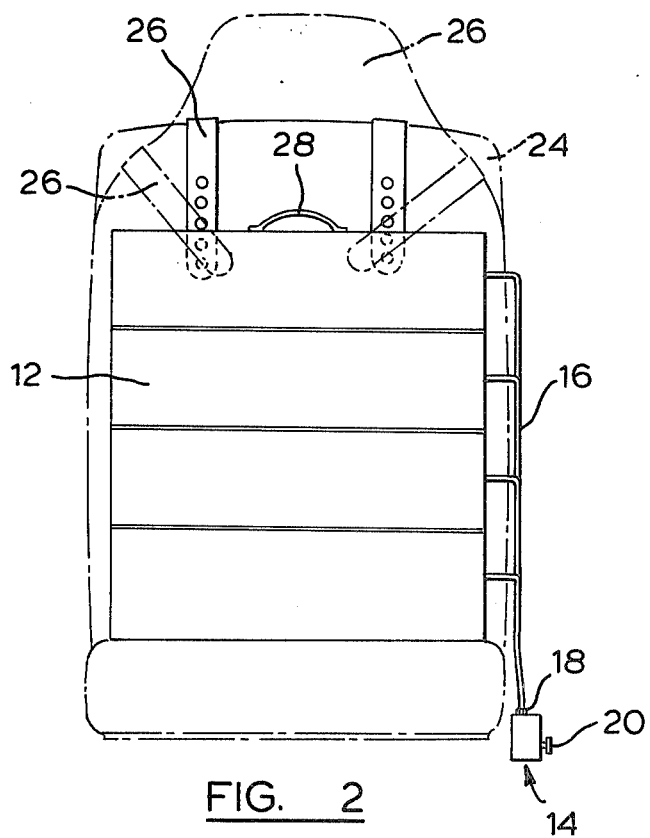
FIG. 2 is a general elevation showing the inflatable seat cushion and body support in relation to several different kinds of automotive operator's seats.

It should be noted that the seat cushion assembly 10 may be secured to a seat such as seat 22 having a back 24 or 26 as shown in FIGS. 1 and 2, and the seat cushion assembly 10 may be conveniently secured thereto by such as straps 26. A handle 28 is provided for portability of the seat cushion assembly.

As noted, it is particularly desirable to inflate each of the chambers 12, and to control the amount of inflation either when the chamber is being inflated or by dumping or venting or otherwise releasing the inflating fluid from each individual chamber 12 to an amount desirable by the operator, by manipulation of suitable valve and control means. It is contemplated that, in general, the inflating or pressure fluid would be air, whose source may be a suitable pump which might be secured to the control block 14 as shown at 30 in FIG. 1, or the control block 14 may be in fluid communication with a source of air or other inflating fluid through a source conduit 32. However, because the control block 14 may be in fluid communication to a constantly pressurized source of pressure, it may be necessary to interpose a master pressure control valve 34—shown in FIG. 3—in the source conduit 32, as discussed in greater detail hereafter. The source conduit 32 may be secured to the control block 14 by means such as nut 36.

In general, the conduits 16 would be heat sealed at their ends remote from the control block 14 to their respective inflatable chambers 12. Likewise, the inflatable chambers 12 may be easily formed in the first instance by heat sealing the seams 13 to a backing material 15 which is common to the entire assembly 10, and which serves to enhance the structural integrity of the assembly.

Figure 3:
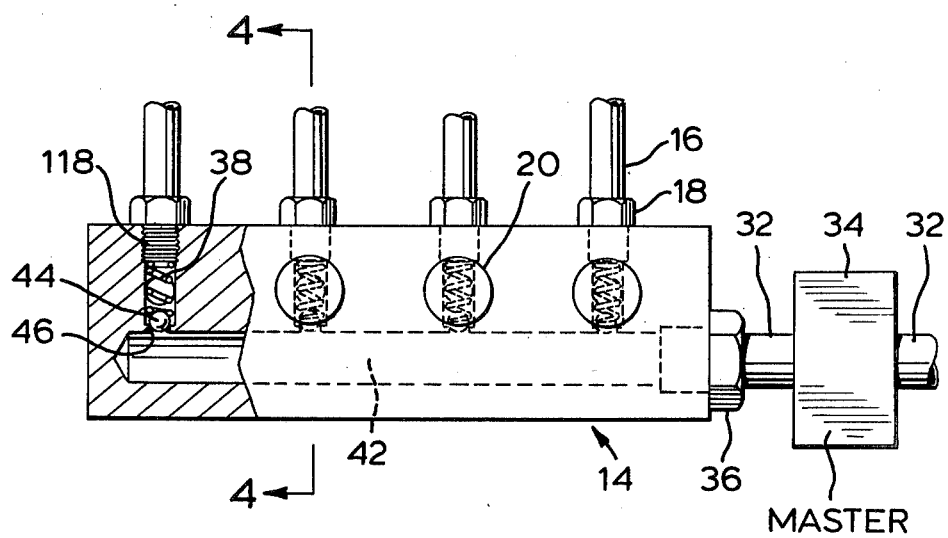
FIG. 3 is a schematic, partially in cross-section, looking in the direction of arrows 3—3 in FIG. 3, of a typical control and valve block for the seat cushion assembly.
Figure 4:
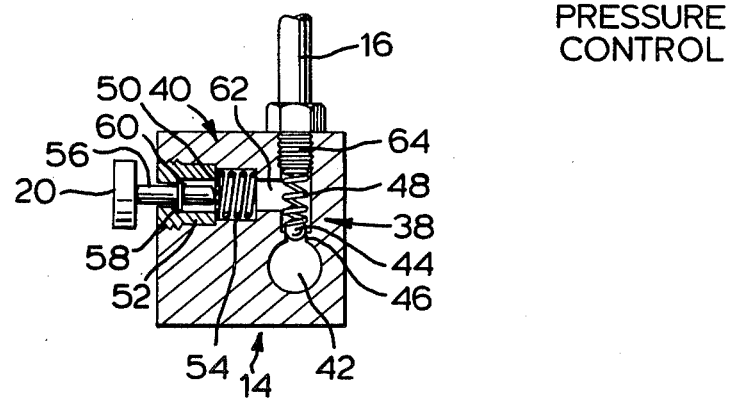
FIG. 4 is a cross-section through a valve arrangement for any one chamber of the inflatable seat cushion, looking in the direction of arrows 4—4 in FIG. 3.

Referring now to FIGS. 3 and 4, a typical valve arrangement is shown whereby the seat cushion assembly of the present invention may be controlled as to the amount of inflation of each of the individual chambers 12. In general terms, with respect to the valve assembly, it is installed within the control block 14, and comprises, for each chamber, a first valve means 38 and a second valve means 40. The first valve means 38 is such that it connects each of the individual chambers 12 via the conduit means 16 to the pressure source of fluid via source conduit means 32. According to the present invention, the first valve means 38 is closable so as to maintain the fluid in each individual chamber 12 at a desired amount of inflation thereof. The second valve means 40 is provided so as to be in fluid communication with the conduit means 16 and is operable to release fluid from the respective chamber.

A convenient and easily manufactured multiple valve assembly is particularly shown in FIGS. 3 and 4, and comprises a common pressure manifold 42 within the body of the control block 14, with each of the first valve means 38 for each respective inflatable chamber 12 communicating with the manifold 42. A particularly suitable arrangement for each valve 38 comprises a ball 44 adapted to seal against a seat 46, and being biased to the closed or seated position by such as a coil spring 48. Where the manifold 42 is not always in fluid communication with a pressure source, the valves 38 can be check valves; and such valves would be biased to a closed position by the pressure communicating to them from the chamber 12 via conduit 16. For additional control, and particularly where a constant source of pressure is present to which the source conduit 32 is connected, a master pressure control 34 may be desirable. As noted, in any event, the first valve means 38 is operable upon pressurization of the manifold 32 to a pressure above a predetermined minimum pressure—which may be the pressure then existing in the chambers 12 or the seating pressure of the balls 44 against the seats 46 due to the springs 48—when the pressure within the manifold 42 exceeds the predetermined pressure, then the valves—whether they be ball valves or flap valves—open, thereby permitting fluid flow of the pressurizing fluid from the manifold 42 past each respective valve and into the respective chambers 12. When the valves are flap valves or check valves, the predetermined pressure within the manifold 42 at which the valves will open may be less than when the valves are ball valves.

When the chambers 12 have been inflated, it may then be desirable to control the amount of inflation of each individual chamber 12, so as thereby to control the precise contour of the seat cushion assembly 10 to the individual requirements of the person then using the inflatable seat cushion. Thus, it is necessary that the second valve means 40 be such as to be in fluid communication via the conduit means 16 to the inflatable chambers 12, and be operable so as to release the inflating fluid from the chamber to a sink of lower pressure than the pressure within the inflated chambers 12. Where the inflating fluid is a gas, such as air, the lower pressure sink may simply be the ambiant; and where the pressure fluid is an exhaust gas or a liquid, a closed system may be provided. In any event, the valves 40 vent or dump a desired amount of pressure fluid from each individual chamber 12, upon manipulation of the valve, by the operator.

Thus, the individual second valve means 40 for each of the inflatable chambers 12 comprises a seatable valve which is biased to its closed position, and has means for unseating that valve so as to permit fluid flow past the valve to the lower pressure sink while the valve is unseated by manipulation of the unseating means therefor. Referring to FIG. 4, a particularly useful valve assembly is shown, which comprises a seatable disc valve 50 which seats against a seat block 52 which is threaded into the body of control block 14, and is biased into the seated or closed position by such means as spring 54. A valve stem 56 is provided having button 20 at its outer end, and having a retaining collar 58 which seats against shoulder 60 in the seat block 52. It will be seen that manipulation of the valve 40 is accomplished by pressing the button 20 thereby causing movement of the valve stem 56 inwardly against the disc valve 50, which is unseated by moving against the spring 54. So long as the valve 50 remains unseated, gas communication from the conduit 16 is permitted through valve conduit 62, past the spring 54 and the disc 50, and past the valve stem 56. In a closed pressure fluid system, communication on the side of the valve 50 remote from the conduit 16 would be to a further conduit in communication with the pressure sink, with suitable sealing means provided against leakage of the fluid past the valve stem 56.

It will be seen that assembly of the control block 14 is very simple, in that the manifold 42 and all of the individual valve conduits for the valves 38 and 40 may be drilled into a solid block of suitable material such as a plastic—for example acrylic, polycarbonate or polyurethane—hard rubber, metal and so on. The first valve means 38 for each chamber 12 are each secured in place by threaded collar 64, and the second valve means 40 are each secured in place by threaded seat blocks 52. The bores for the valve assemblies 38 and 40 may therefore be suitably tapped. Likewise, the connection of the source conduit 32 by nut 36 at the open end of manifold 42 may be achieved by suitable tapping at the end of the manifold.

When it is desired that each of the chambers 12 be controlled as to the amount of inflation thereof initially——ie, upon inflation—each of the valve assemblies 38 communicating the chambers to the source of pressure fluid must be individually operable. It is convenient in such cases, to substitute valve assemblies having similar constructions to those of valve assemblies 40 for the valve assemblies 38. In such cases, each of the inlet valves would again be biased to its closed position, but would have means—such as valve stem 56—which would act against the means which biases the valve to its closed position so as to permit fluid flow past the valve to its respective chamber 12.

There has been described and illustrated an inflatable seat cushion assembly, whereby the amount of inflation of each individual chamber thereof may be controlled, so as to thereby control the contour of the seat cushion assembly. Means for controlling the amount of inflation of each individual chamber have been shown, and it has been indicated that the inflating fluid which may be used may be a gas or a liquid, and that the pressure source therefor may be any suitable source of the sort normally found in vehicles especially trucks and the like. A suitable valve arrangement has been shown, and alternative arrangements contemplated.

Other alternatives are, of course, possible and other materials than the ones mentioned may be used, without parting from the spirit and scope of the appended claims.

The embodiments of the invention in which an exclusive property or privilege is claimed are defined as follows:

1. For use as a seat cushion and body support, an inflatable seat cushion assembly, comprising:
   A plurality of independent and individually inflatable chambers, each of said plurality of chambers being secured to at least one other chamber; and
   means for controlling each of the chambers, including, for each chamber;
   first valve means for connecting a chamber to a pressure source of fluid for inflating a chamber, said check valve means permitting fluid flow from said pressure source of fluid, when pressurized, to the respective chamber, said first check valve means being closable for maintaining said fluid in a respective chamber at a desired amount of inflation thereof;
   conduit means for said fluid between said first check valve means and a chamber;
   second seatable valve means provided in a control block and in fluid communication with said conduit means and operable to release fluid from a respective chamber, said seatable valve means being biased to a closed position and including means for unseating said valve means to permit fluid flow past the valve to a lower pressure sink while the valve is unseated by said means therefor; and
   wherein all of said first check valve means are also located in said control block and communicate with a common pressure manifold and are biased to a closed position to preclude fluid flow from any chamber past its respective valve to said manifold, said manifold also being in said control block, and said first check valve means are operable upon pressurization of said manifold above a predetermined minimum pressure to allow fluid flow past said valves to the respective chambers.

2. The assembly of claim 1, further comprising: master pressure control means for pressurizing said manifold above said predetermined minimum pressure.

3. The assembly of claim 1 wherein each said second valve means comprises a disc valve which is spring-loaded to its seated position, and a stem operable against the spring-load on said disc to unseat said disc, whereby said pressure fluid is permitted to flow past said disc.

4. The assembly of claim 1 where said fluid for inflating said chambers is air, and the pressure source therefor is a pump.

5. The assembly of claim 2 where said fluid for inflating said chambers is a pressurizable gas.

6. The assembly of claim 5 where the pressure source for said pressurizable gas is any source of pressure of a pressurizable gas as may be found in a vehicle.

7. The assembly of claim 1, further comprising:
a handle strap secured to at least one of said chambers so as to render the assembly easily portable by a person.

* * * * *